Dec. 10, 1968  P. E. HANSER  3,415,327
HYDRAULIC COUPLING

Filed May 6, 1966  2 Sheets-Sheet 1

INVENTOR.
PAUL E. HANSER
BY William A. Murray
ATTORNEY

Dec. 10, 1968   P. E. HANSER   3,415,327
HYDRAULIC COUPLING

Filed May 6, 1966   2 Sheets-Sheet 2

*INVENTOR.*
PAUL E. HANSER
BY *William A. Murray*

ATTORNEY

United States Patent Office 3,415,327
Patented Dec. 10, 1968

3,415,327
HYDRAULIC COUPLING
Paul Edmund Hanser, Rock Island, Ill., assignor to Deere & Company, Moline, Ill., a corporation of Delaware
Filed May 6, 1966, Ser. No. 548,181
9 Claims. (Cl. 172—793)

This invention relates to a hydraulic coupling that is self-adjustable to accommodate relative movement between parts of the coupling. More particularly this invention relates to a hydraulic coupling that is used in combination with a power operated implement in which there is provided a main frame, an implement, and a connecting means between the frame and implement that is adjustable to permit angular movement of the implement about an upright axis. The hydraulic coupling is used primarily for the purpose of moving fluid from a hydraulic source on the main frame to a hydraulic motor on the implement.

It is the primary object of the invention to provide such a coupling that includes a stacked plurality of plates having adjoining surfaces. The plates have annular grooves at the adjoining surfaces that are formed about the axis of the swivel between the implement and main frame. Part of the plates is fixed to the frame and part thereof is fixed to the implement. Suitable sealing rings are inserted between the adjoining surfaces and at a location between the annular grooves. Fluid is introduced to the grooves through inlets that are connected to the main power source of the power implement. Outlets are provided in the plates that are connected to the hydraulic motors on the implement. The plates are fixed in their stacked relations and the hydraulic fluid as well as the annular sealing rings operates to provide a bearing surface so that the part of the plates fixed to the implement may swivel with the implement and in respect to the other part of the plates that is fixed to the main frame.

In the preferred form of the invention there is provided a stack of three plates wtih the outer plates sandwiching the central plate therebetween. The central plate is fixed to the implement and the outer plates are interconnected and are fixed to the frame. Annular grooves are provided in the adjoining surfaces between the central plate and the outer plates. Such grooves are interconnected so that equal pressure is provided on opposite sides of the plate. The outlets are passages within the central plate that extend from the edge of the plate to a connecting tunnel between the grooves on the opposite surfaces of the central plate. Fluid inlets are passages that extend from the outer surface of at least one of the outer plates axially to the respective annular grooves of the adjoining surfaces.

Other objects and advantages of the invention will become apparent to those skilled in the art as the nature of the invention is better understood from the following description and as shown in the accompanying drawings.

FIG. 2 is a side and overhead perspective view showing the hydraulic coupling and a portion of the implement that the coupling is connected to.

Figure 1:
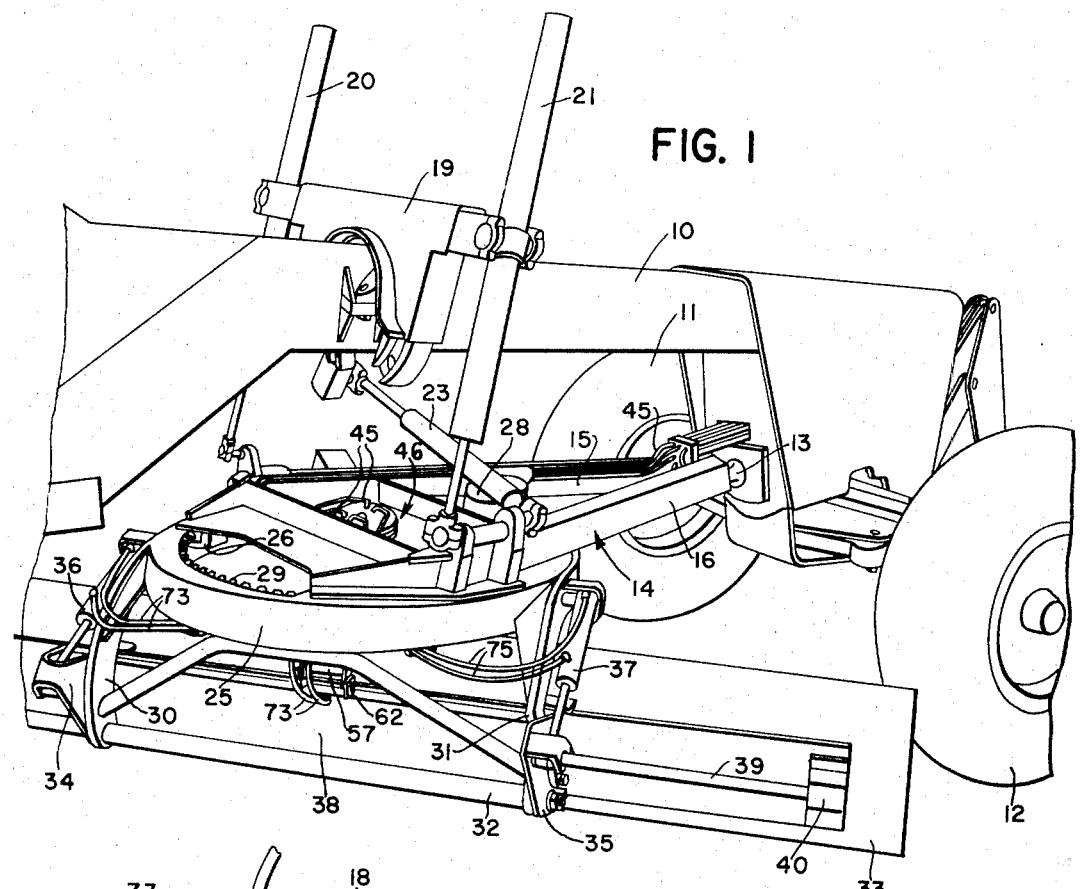
FIG. 1 is a side and rear perspective view of the front portion of an implement incorporating the hydraulic coupling of the present invention.

The hydraulic or fluid coupling is designed for use with a road grader having a fore-and-aft extending vehicle frame 10 supported at its rear on traction wheels, not shown, and by a pair of front steerable wheels 11, 12. The vehicle frame articulately carries in a ball and socket joint, shown partially at 13, a main implement frame 14. The main frame 14 is composed of a pair of rearwardly diverging beams 15, 16 rigidly interconnected by transverse beams 18. The main frame 14 is tilted in respect to the vehicle frame 10 by means of a saddle structure 19 and hydraulic cylinders 20, 21, 23 that extend from the saddle structure 19 to various portions of the frame 14. A circle structure 25 is disposed beneath the rear end of the main frame 14 and suitable guides, such as are shown at 26, are fixed to the frame 14 and extend under the circle 25 to guide it in a swivel action about an upright axis. A motor 28 is carried on the forward transverse beam 18 and has a gear, not shown, that engages a toothed edge 29 of the circle and operates to swivel the circle about the aforementioned upright axis. Such a frame 14, guides 26, motor 28, and the drive mechanism for rotating the circle are well known in the grader field and consequently it is believed no further detail of such structures need be given for a full understanding of the present invention.

Fixed in depending relation to the circle structure 25 is a pair of arcuate brackets 30, 31 that carry at their lower ends a transverse rod structure 32 on which is carried an implement in the form of a grader blade 33. The blade 33 is provided with a pair of rearwardly projecting brackets 34, 35. A pair of cylinders 36, 37 extends from upper portions of the arcuate brackets 30, 31 to the respective brackets 34, 35 and operates to adjustably tilt the blade 33 in respect to the ground. A hydraulic cylinder 38 is supported on the rear side of the blade 33 and has a rod end 39 that extends outwardly to a bracket 40 on the end of the blade 33. By suitable adjustment of the rod 39 within the cylinder 38, the transverse disposition of the blade in regard to the frame 14 may be adjusted.

As is conventional a hydraulic pump is supplied on the main vehicle to provide a fluid source for the various hydraulic motors on the vehicle and between the frame 14 and blade 33. Hydraulic lines, such as at 45, extend rearwardly from the forward part of the implement alongside the internal surface of the side beams 15, 16 and feed into a hydraulic coupling, indicated in its entirety by the reference numeral 46. The coupling 46 is composed of a vertical stack of plates including upper and lower outer plates 47, 48 and a central plate 49 sandwiched between the plates 47, 48. The upper and lower plates 47, 48 are rigidly interjoined by a bolt 50 that is centrally located in the stack of plates and is disposed substantially on the upright axis of rotation of the gear structure 25. The bolt 50 extends through the central plate 49 and consequently, as will later be more fully understood, the plate 49 may rotate about the bolt 50. The upper plate 47 has a flange portion 53 with a pair of tapped openings 51. The flange 53 bears against the outer surface of a U-shaped bracket 52 that is fixed to the cross beam 18. Bolts, not shown, extend through the bracket 52 and are received in the tapped openings 51 of the flange 53. Consequently the upper plate 47 as well as the lower plate 48, which is fixed to the upper plate 47, is fixed to the main implement frame 14. The central plate 49 is provided with a flange 54 that has a pair of transverse tapped openings 55 on each side thereof. A linkage 56 composed of a lower link 57 and an upper link 58 extends from the implement blade 33 upwardly to the central plate 49. The upper link 58 is bifurcated at its upper end and has leg portions 59 disposed alongside the tapped openings 55 so that bolts 60 may be utilized to connect the linkage 56 to the plate 49. The links 57, 58 are interconnected by a transverse pin 61 and the lower link 57 is connected to the back of the blade 33 by means of a transverse pin 62. The linkage 56 is therefore articulate to accommodate tilting movement of the implement blade 33 in respect to the frame 14. However, the linkage 56 operates to restrict angular movement of the central plate 49 to that of the angular movement of the implement 33.

A series of annular grooves 65 is provided in the upper and lower surfaces of the central plate 49. The grooves 65 are spaced apart in a radial dimension from the axis of rotation of the plate 49. The grooves 65 in the upper surface are directly opposite the grooves 65 in the lower surface and each set of grooves is joined or in communication with one another by means of axial passages 66.

Between each of the annular fluid grooves 65 is an annular sealing ring 68. The rings 68 obviously prevent fluid moving between the various fluid grooves 65. A pair of outer rings 67 is provided on the upper and lower surfaces of the plate 49 and operates to prevent external leakage of fluid.

Figure 2:
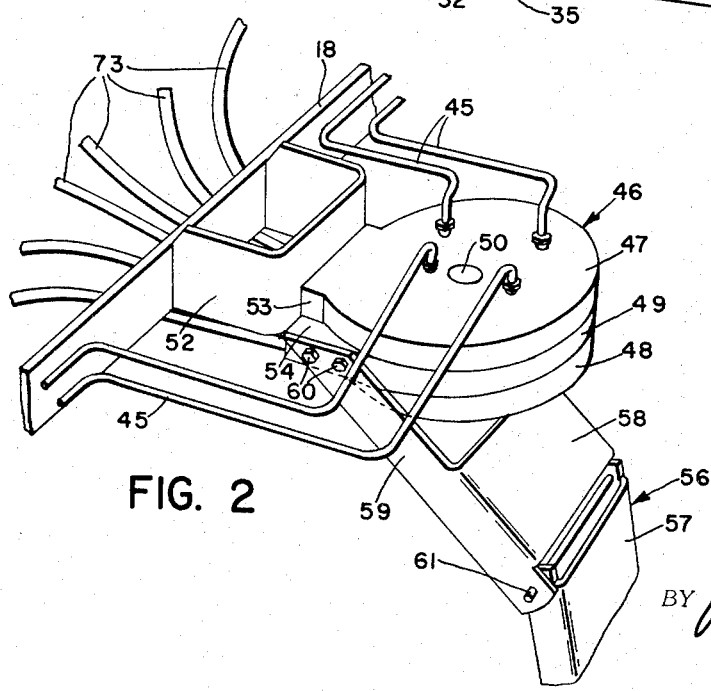
Figure 4:
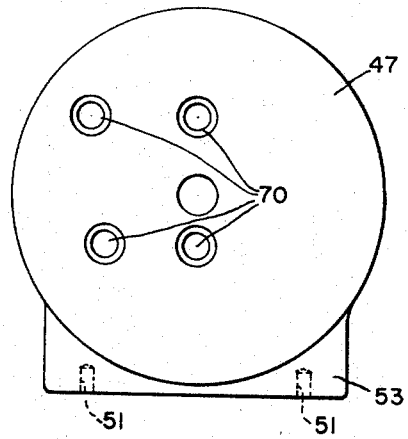
FIG. 4 is a plan view of the upper plate of the coupling.
Figure 5:
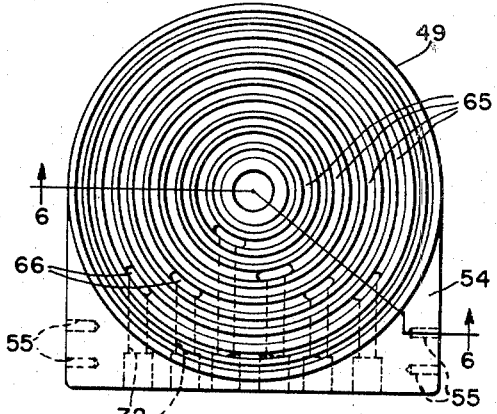
FIG. 5 is a plan view of the central plate of the hydraulic coupling.
Figure 6:
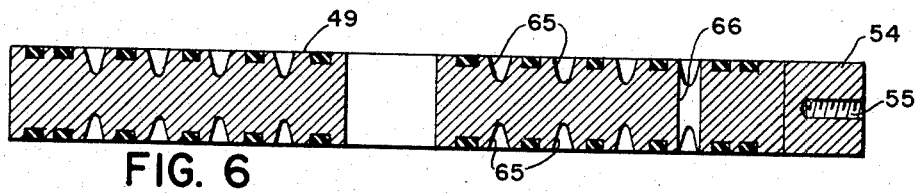
FIG. 6 is a sectional view taken substantially along the line 6—6 of FIG. 5.
Figure 3:
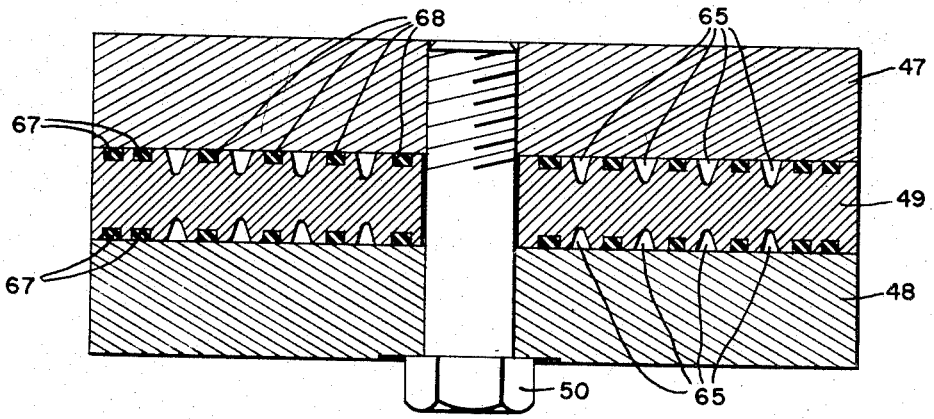
FIG. 3 is a vertical sectional view taken along a transverse plane through the coupling.

The upper plate 47 is provided with a series of fluid inlets 70 that are radially spaced from the center of the plate substantially in accordance with the spacing of the respective grooves 65 from the center of the plate 49. The inlets 70 open into the respective grooves 65. Since the grooves 65 on the upper and lower surfaces of the plate 49 are interconnected by the passages 66, equal pressure of fluid will be applied to the upper and lower plates 47, 48. Since it is desired to permit rotation of the central plate 49 relative to the upper and lower outer plates 47, 48, by providing equal pressure in the upper and lower grooves 65, there will not be a clamping action by the hydraulic fluid between a surface of the central plate 49 and the adjoining surface of either of the plates 47, 48. Consequently the only pressure that exists between the upper and lower plates 47, 48 and the central plate 49 is that which is created by the bolt 50. As is clearly apparent from viewing FIG. 2, the outlets 70 are connected to the fluid lines 45. Outlet passages 72 extend inwardly from the edge of the plate 49 between the grooves 65 and connect to the vertical passages 66. Hoses 73 connect to the outlets 72 and extend to the various hydraulic cylinders 36, 37 and 38 on the implement. As is readily apparent, since the hydraulic cylinders 36, 37, 38 will rotate with the implement about the upright axis of the circle 25, it is necessary that the plate 49 will also operate to rotate with the implement. The linkage 56 forces the plate 49 to move with the implement 33. It should also be recognized that the hydraulic fluid itself will operate as a lubricant to decrease the friction between the upper and lower plates 47, 48 and the central plate 49.

While only one form of the invention has been shown, it should be recognized that other forms and variations thereof will occur to those skilled in the art. Therefore while the preferred form was shown in concised and detailed manner for the purpose of clearly explaining the invention, it should be understood that there was no intention to limit or narrow the invention beyond the broad concept set forth in the appended claims.

What is claimed is:

1. In a power implement in which there is provided a main frame, an implement, a connecting means between the frame and implement for adjusting the implement angularly about an axis, a hydraulic source on the frame, and hydraulic motors on the implement, the improvement residing in a hydraulic coupling that is self-adjustable to accommodate movement of the implement relative to the frame comprising: a plurality of parallel and stacked plates with adjoining surfaces with part thereof having annular and radially spaced surface grooves therein; annular sealing rings between the grooves; means fixing one of the plates to the frame; means fixing another of the plates to the implement; a plurality of fluid inlets in said one of the plates for receiving fluid from the hydraulic source and passing it to the annular grooves; and fluid outlets in said another of the plates in communication with the grooves, with each of the outlets being adapted for connection to fluid lines extending to the hydraulic motors on the implement.

2. The structure as set forth in claim 1 further characterized by the annular grooves being concentric in respect to the axis.

3. The structure as set forth in claim 1 in which the plates are three in number with two outer plates sandwiching a central plate therebetween and whereby the annular grooves are between the adjoining surfaces on both sides of the central plate, and further characterized by fluid passages in the central plate with each passage interconnecting a groove on one adjoining surface to a groove on the other adjoining surface whereby the fluid pressure on opposite surfaces of the central plate will be substantially equal.

4. The structure as set forth in claim 3 in which the outer plates are rigidly interjoined by an axial stud element projecting through the central plate.

5. The structure as set forth in claim 3 further characterized by the fluid outlets being radially disposed passages in the central plate extending from the edge of the plate to a passage interjoining a pair of grooves on opposite sides of the central plate.

6. The structure as set forth in claim 3 further characterized by the inlets being a series of axially extending passages projecting through at least one of the outer plates to afford communication with the respective annular grooves and are radially offset from the axis substantially in accordance with the axial offset of the grooves with the axis.

7. The structure as set forth in claim 1 further characterized by the implement being adapted for movement in respect to the main frame and the means fixing said another of the plates to the implement is a linkage adapted to articulate to accommodate other than angular movement of the implement in respect to the frame while restricting angular movement of the latter plate to that of the angular movement of the implement.

8. A hydraulic coupling between a plurality of fluid inlet and outlet lines comprising: a group of stacked plates interconnected by a central shaft-like member including a pair of outer plates and central plate between the outer plates and adapted to permit swiveling between the outer and central plates; annular fluid grooves and sealing rings spaced radially and alternately in respect to the shaft-like member and on the surfaces adjoining the outer and central plates; fluid passages extending through at least one of the outer plates and in communication with the grooves; and fluid passages extending from the edge of the central plate to the grooves; and means for connecting the passages to the inlet and outlet lines.

9. The invention defined in claim 8 further characterized by the grooves in the adjoining surfaces on opposite sides of the central plate being interjoined by passages so that substantially equal pressure may be applied by the fluid against the outer plates.

References Cited

UNITED STATES PATENTS 1,012,109  12/1911  Stockland _____ 172—781
3,368,851  2/1968  Eggman _____ 308—9

ABRAHAM G. STONE, *Primary Examiner.*

S. C. PELLEGRINO, *Assistant Examiner.*

U.S. Cl. X.R.

308—9, 160